United States Patent Office 2,783,178
Patented Feb. 26, 1957

2,783,178

STABLE CONCENTRATED SULFAQUINOXALINE SOLUTIONS AND METHOD FOR PREPARING

Philip G. White, Madison, Wis., assignor to American Scientific Laboratories, Inc., Madison, Wis., a corporation of Wisconsin No Drawing. Application June 22, 1954,
Serial No. 438,630

6 Claims. (Cl. 167—53.1)

This invention relates to a process for preparing high concentrations of sulfaquinoxaline which heretofore have been unobtainable. Specifically this invention relates to the formation of stable solutions containing 50% sulfaquinoxaline where previously formulators of sulfaquinoxaline solutions have been able to produce stable solutions of sulfaquinoxaline of only about 16%.

Sulfaquinoxaline has been recognized for some time as a sulpha-compound possessing highly desirable therapeutic properties. For example, it has been noted that sulfaquinoxaline has proven very effective as a bactericide in the treatment of a number of specific diseases peculiar to poultry and accordingly considerable demand has been created for this compound particularly in more concentrated forms. Although several methods of preparing sulfaquinoxaline have been devised, attempts to form high concentrations of this valuable sulpha-compound have apparently been unsuccessful. For example, a 50% solution of the sodium salt of sulfaguinoxaline prepared by dissolving the sulfaquinoxaline in excess sodium hydroxide is extremely unstable and precipitates out rapidly while a 50% concentration of the sulfaquinoxaline can not be put into solution by using an excess of potassium hydroxide. Accordingly, it is an object of this invention to provide a method of preparing sulfaquinoxaline in high concentrations which are in demand from a commercial standpoint.

It is a further object of this invention to provide a highly concentrated stable solution of sulfaquinoxaline by utilizing a plurality of solvents in a novel manner.

In accordance with the present invention, the constituents which may make up this stable solution are as follows:

|  | Percent |
|---|---|
| Sulfaquinoxaline | w./v.— 50.0 |
| Sodium hydroxide | w./v.— 4.0 |
| Potassium hydroxide | w./v.— 5.0 |
| Sodium hexametaphosphate | w./v.— 0.5 |
| Tap water, q. s. | v.— 100.00 |

A preferred manner in which to prepare this solution is to use a stainless steel tank or similar high alkali resistant container into which is poured two-thirds of the desired volume of water. The tank should be provided with a means of mechanical agitation so as to insure internal mixing without whipping air into the resulting solution. The sodium hydroxide, potassium hydroxide and sodium hexametaphosphate are then added in the order given. These ingredients are agitated until thoroughly dissolved. The sulfaquinoxaline is then added and agitated until completely dissolved. Tap water which is adjusted to pH 12.5 is then added to make up to 100% volume. By using a mixed solution of sodium and potassium hydroxide, the 50% sulfaquinoxaline concentration goes into solution readily and forms a stable soluble complex of sodium sulfaquinoxaline and potassium sulfaquinoxaline in excess hydroxide. This represents a distinct advance over the previously obtained stable sulfaquinoxaline compounds which contain only about 16 percent of the desired sulpha-compound. In the above formulation the sodium hexametaphosphate is added as a sequestering agent so as to insure clear solutions even where extremely hard waters are used.

It should be understood that the above example for making stable 50% solutions of alkali metal salts of sulfaquinoxaline is given by way of illustration and not of limitation.

Various changes may be made in carrying out the present invention without departing from the spirit and scope thereof. For example, the amount of sodium hexametaphosphate used may be reduced in quantity or omitted where soft or extremely soft water are available. Moreover, with respect to the mixing of the hydroxides, it is obvious that the potassium hydroxide may be added before the sodium hydroxide and vice versa.

I claim:

1. The process for making a stable sulfaquinoxaline concentrate which comprises, forming an aqueous solution of sodium hydroxide and potassium hydroxide, adding sulfaquinoxaline in the amount of 50% by weight of the total volume of concentrate to be made and thereafter adding water to make the desired 100% volume.

2. The process for making a stable sulfaquinoxaline concentrate which comprises, forming an aqueous solution containing less than 10% of potassium and sodium hydroxides by weight of the total volume of the concentrate to be formed, adding sulfaquinoxaline in the amount of 50% by weight of the total volume of the concentrate to be formed and thereafter adding water to make the desired 100% volume.

3. The process for making a stable concentrate containing at least 50% of a complex sodium sulfaquinoxaline and potassium sulfaquinoxaline in solution which comprises, forming an aqueous solution of sodium and potassium hydroxides, adding sulfaquinoxaline in the amount of 50% by weight of the total volume of concentrate to be made and thereafter adding sufficient water to make the 100% volume desired.

4. The process for making a stable concentrate containing at least 50% of a complex sodium sulfaquinoxaline and potassium sulfaquinoxaline in solution which comprises, forming an aqueous solution of sodium hydroxide, potassium hydroxide, and sodium hexametaphosphate, adding sulfaquinoxaline in the amount of 50% by weight of the total volume of concentrate to be made and thereafter adding sufficient water to make the 100% volume desired.

5. A stable composition of matter comprising a homogeneous mixture of the following compounds in the proportions indicated:

|  | Percent |
|---|---|
| Sulfaquinoxaline | w./v.— 50.0 |
| Sodium hydroxide | w./v.— 4.0 |
| Potassium hydroxide | w./v.— 5.0 |
| Water, q. s. | v.— 100.0 | said composition being formed in accordance with the process of claim 3.

6. A stable composition of matter consisting of a homogeneous mixture of the following compounds in the proportions indicated:

|  | Percent |
|---|---|
| Sulfaquinoxaline | w./v.— 50.0 |
| Sodium hydroxide | w./v.— 4.0 |
| Potassium hydroxide | w./v.— 5.0 |
| Sodium hexametaphosphate | w./v.— 0.5 |
| Water, q. s. | v.— 100.00 | said composition being formed in accordance with the process of claim 4.

References Cited in the file of this patent

UNITED STATES PATENTS

| | | |
|---|---|---|
| 2,538,092 | Gakenheimer | Jan. 16, 1951 |
| 2,578,761 | Sweet et al. | Dec. 18, 1951 |

OTHER REFERENCES

Seiden: Manufg. Chem., vol. 21, No. 4, April 1950, pp. 155 and 156.

The Merck Index: 6th Ed. 1952, Merck & Co., Rahway, N. J., p. 921.

UNITED STATES PATENT OFFICE
CERTIFICATE OF CORRECTION

Patent No. 2,783,178                                                            February 26, 1957

Philip G. White

It is hereby certified that error appears in the printed specification of the above numbered patent requiring correction and that the said Letters Patent should read as corrected below.

Column 2, between lines 18 and 19, insert the following paragraph:

> It is to be understood that the proportions specified in the following claims are approximate.

Signed and sealed this 16th day of June 1959.

(SEAL)
Attest:

KARL H. AXLINE
Attesting Officer

ROBERT C. WATSON
Commissioner of Patents